ABSOLUTE VALUE ADJUSTABLE LIMITER

Filed Jan. 16, 1967

WITNESSES

Irwin A. Shaw

Helen M. Harkas

INVENTORS
Robert E. Hull &
James K. Kroeger

BY M. J. Brodahl
ATTORNEY

United States Patent Office 3,525,881
Patented Aug. 25, 1970

3,525,881

ABSOLUTE VALUE ADJUSTABLE LIMITER

Robert E. Hull, Amherst, and James K. Kroeger, Williamsville, N.Y., assignors to Westinghouse Electric Corporation, Pittsburgh, Pa., a corporation of Pennsylvania Filed Jan. 16, 1967, Ser. No. 609,476
Int. Cl. H03k *5/08*
U.S. Cl. 307—237 5 Claims

ABSTRACT OF THE DISCLOSURE

A limiter device for an operational amplifier which provides a symmetrical limit control of the amplifier positive and negative output voltages as a function of an applied absolute limit control voltage. In addition, the limiter device provides wide range adjustments for parameters associated with the absolute limit control voltage which may substantially alter the positive and negative output voltages of the amplifier while still maintaining symmetry.

The present invention relates to limiter circuits and more particularly to absolute signal value adjustable limiter circuits for use with operational elements.

In many control system applications it is necessary to limit the output signal voltage of various operational elements, such as operational amplifier circuits, to within fixed excursion limits. It is essential that the output voltage of the operational element be limited in both the positive and negative excursion directions, and it is highly desirable if certain operating features can be adjustable thereby giving greater flexibility by parameterizing certain limiting characteristics of operation. Heretofore, a major disadvantage associated with threshold devices was that for each different type of operation required, a distinct and different apparatus had to be built or else substantial circuit modifications were required. It would, therefore, be highly desirable if the complete operation of a limiter could be adjusted electrically without the necessity of device replacement or circuit modification.

It is, therefore, an object of the present invention to provide a new and improved adjustable limiter circuit.

It is a further object to provide a new and improved limiter circuit which is better adjustable through the application of control signals thereto.

It is a still further object to provide a new and improved adjustable limiter circuit for controlling the output characteristics of an operational element wherein the output signal voltages are controlled electrically without the necessity of changing or modifying circuit elements to effect the adjustability.

Broadly, the presently invention provides a limiter circuit for controlling the output signal of an operational element in response to an input signal where the level, gain and breakpoints of the output signal are independently adjustable in response to the input signal being either of positive or negative polarity.

These and other objects and advantages of the present invention will become more apparent when considered in view with the following specification and drawings, in which.

Figures 1, 3, 4, 5:
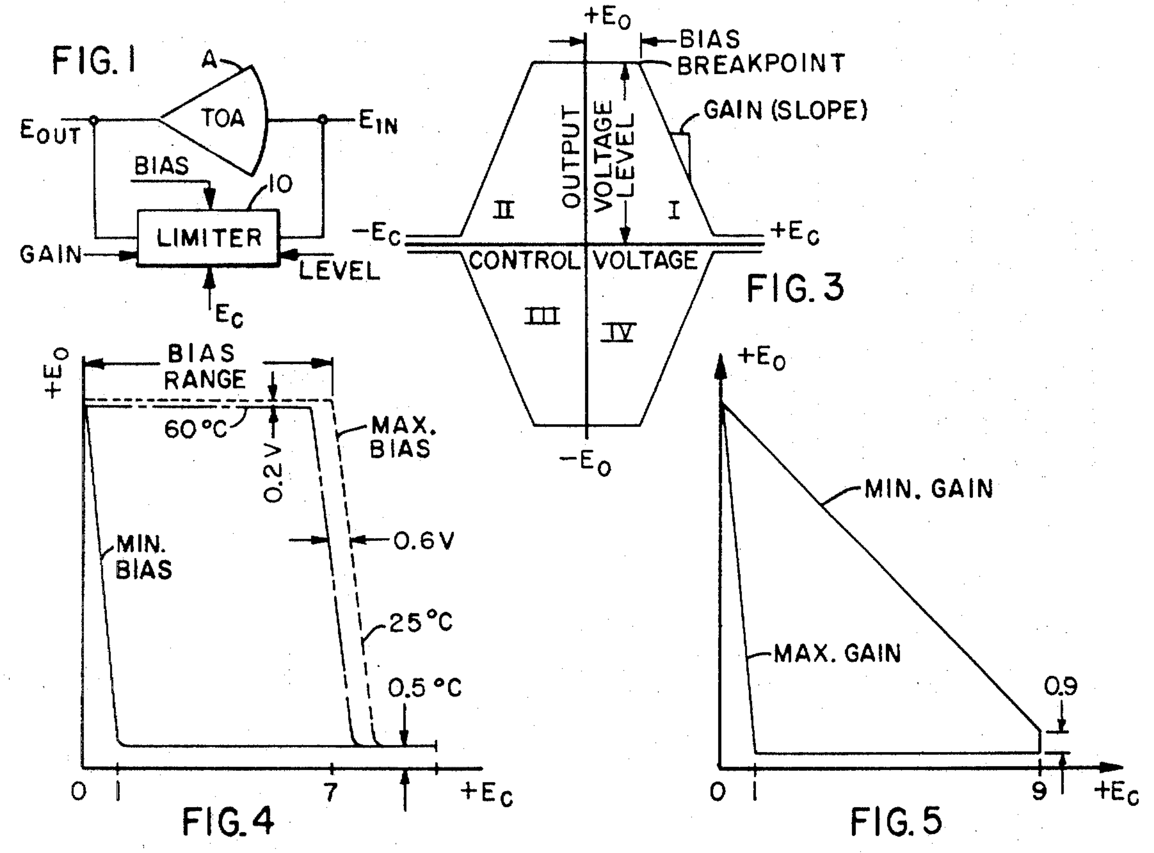
FIG. 1 is a diagrammatic representation of the present invention whereby a limiter circuit is inserted in the feedback path of a transistor operational amplifier or TOA.
FIG. 3 is a plot of output voltage versus control voltage as provided in the circuit of FIG. 2.
FIGS. 4 and 5 are first quadrant plots of output voltage and input control voltage respectively at varying operating conditions.

Referring to FIG. 1, an operational element A is shown which is advantageously a transistor operational amplifier of the type well known in the art to provide an output voltage proportional to an input voltage and inverted in polarity. It is the function of the presently disclosed limiter circuit to control the output signal characteristics independently of the ampltiude of the input signals applied to the operational amplifier A. This result is accomplished by insertion of a limiter circuit 10 into the feedback path of the operational amplifier A. To insure flexibility and reduce the need for circuit modification separate adjustable controllers for bias, level and gain are provided which effect the output signal in various ways as will be explained in greater detail later in this specification. The limiter 10 operates as a four-quadrant limiter with the output voltage $E_o$ inversely proportional to the absolute value of the control $E_c$. The effect of the limiter 10 is to control the output signal of the operational amplifier by establishing a very low impedance level relative to its input impedance between its input and output. Under these conditions the operational gain of the amplifier becomes very small, and thus increases in the amplitude of the input signal to the amplifier will only cause negligible output level increases. By then controlling the impedance between input and output of the amplifier to have very low value when the desired limiting levels of the amplifier are reached, limiting action may be accomplished.

Figure 2:
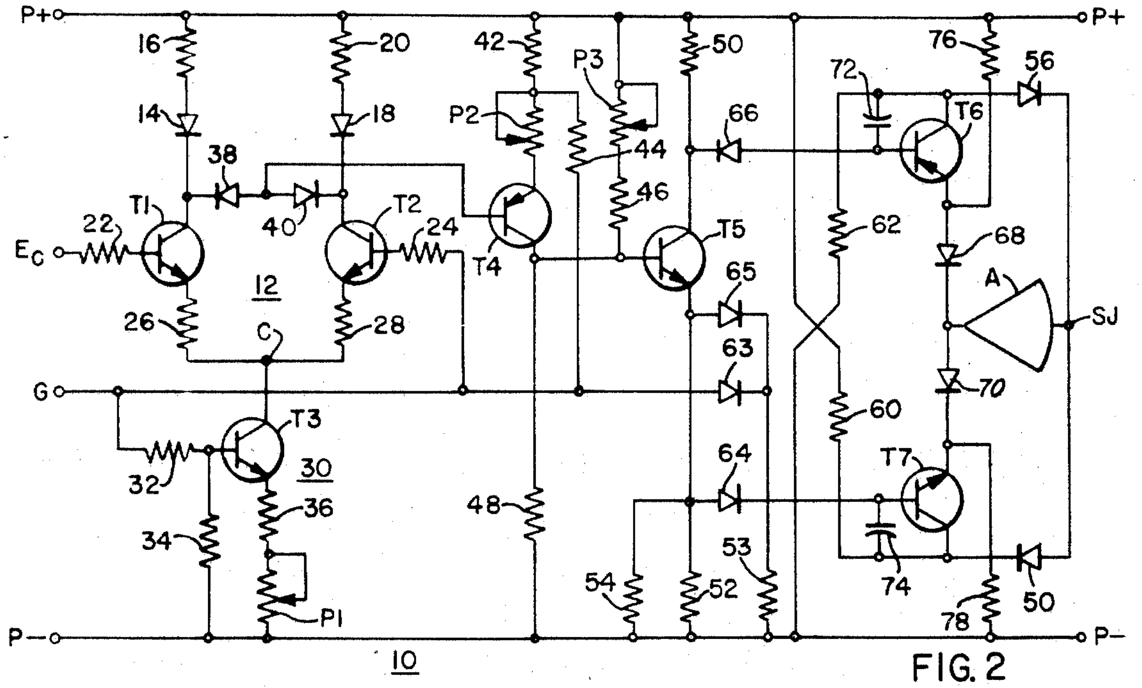
FIG. 2 is a schematic diagram showing the limiter circuit of the present invention.

Referring to FIG. 2, a detailed schematic diagram of the limiter 10 is shown included in the feedback path of an operational amplifier A having a summing junction SJ and an output signal $E_o$. The output of the amplifier is taken from a terminal $E_o$.

The limiter circuit 10 in FIG. 1 has a differential amplifier 12 which operates as an absolute value detector. The transistors T1 and T2 are selected to be of the NPN type. Transistor T1 has a collector connected to a positive voltage source P+ through a diode 14 and a collector resistor 16. In a like manner, the collector of transistor T2 is connected by diode 18 and collector resistor 20 to the same positive voltage source P+. Diodes 14 and 18 are for temperature compensation of the base-emitter junctions of transistors T1 and T2 respectively. The base of transistor T1 is connected to one end of an input resistor 22, the other end of which is connected to an input control voltage $E_o$. Resistor 24 is connected on one side of the base of transistor T2 and on the other side to a common line G, which may be connected to ground. The emitters of transistors T1 and T2 are connected by respective resistors 26 and 28 to terminal C. Between terminal C and a negative potential source P— is a constant current generator 30 which assures that the total current into terminal A from the emitter of transistors T1 and T2 is constant.

The constant current generator 30 is achieved through a transistor T3 having a base connected to common terminal G through a resistor 32. A voltage divider is formed with resistor 32 and a second resistor 34 connected between the base of transistor T3 and the negative voltage source P—. This voltage divider biases transistor T3 on and clamps the emitter voltage at 0.6 less than the base. Connected to the emitter of transistor T3 is a resistor 36. The other end of resistor 36 is connected through a potentiometer P1 to the negative voltage source P—. Since the emitter voltage of transistor T3 is kept constant, changing the tap at potentiometer P1 will change the collector current of transistor T3 which in turn changes the collector voltages of transistors T1 and T2.

The output from the differential amplifier 12 is fed to the base of a transistor T4 through either an isolation diode 38 or an isolation diode 40 depending on whether transistor T1 or T2 is in a conducting state. The emitter of transistor T4 is connected to one side of a potentiometer P2 which is necessary for adjusting the gain of transistor T4. A resistor 42 is connected between the other end of potentiometer P2 and the positive voltage source P+. That end of resistor 42 connecting with potentiometer P2 is also connected to the common terminal G through a resistor 44. This resistor acts in conjunction with resistor 42 to form a voltage divider which holds the emitter of transistor T4 at a predetermined voltage.

Limiting the output level is achieved by controlling the base voltage to transistor T5 which acts as a balanced driver stage. The base voltage of transistor T5 is determined by the collector voltage of transistor T4 when in a conducting state. The collector of transistor T4 is directly coupled to the base of transistor T5 which is in turn connected to the positive voltage supply P+ by a resistor 46 in series with a potentiometer P3. A collector resistor connects the collector of transistor T4 to the negative voltage supply P—. When transistor T4 is not conducting the base of transistor T5 is controlled by the voltage divider including potentiometer P3, resistors 46 and 48. This voltage divider relationship establishes the upper and lower limit levels of the output $E_0$ of the amplifier A. A collector resistor 50 is connected between the collector of the transistor T5 and the positive voltage source P+ while an emitter resistor 52 is connected between the emitter of the transistor T5 and the negative voltage source P—. In a parallel fashion with resistor 52 is another resistor 54 used to compensate for the base current of transistor T5.

A pair of feedback circuits are utilized and each includes respectively, a transistor T6 and a diode 56, and a transistor T7 and a diode 58. The function of the feedback circuits is to provide a low impedance path from input to output of the operational amplifier A whenever the excursion limits of the output of amplifier A are reached. As can be seen from FIG. 2, the emitter electrode of transistor 17 is connected to output terminal $T_0$ through a diode 70 having its cathode in common with the emitter of transistor 17 and its anode in common with output terminal operational amplifier A. Similarly, the emitter of transistor T7 is connected to output terminal $T_0$ through a diode 70 having its cathode in common with the emitter of transistor T7 and its anode in common with output terminal $T_0$. Diodes 68 and 70 are biased on by resistors 76 and 78 respectively such that they cancel the voltage drops of diodes 56 and 58. Bias resistor 76 is connected between the anode of diode 68 and the positive voltage source P+. Similarly bias resistor 76 is interposed between the cathode of diode 70 and negative voltage source P—. The transistor T7 is selected to be an NPN type, and the transistor T6 is selected to be a PNP type. The collector electrode of the transistor T7 is connected to the cathode of the diode 58 which has its anode connected to the summing junction SJ. The collector of the transistor T6 is connected to the anode of the diode 56 which has its cathode connected to the summing junction SJ.

The transistor T7 has its collector connected through a collector resistor 60 to the positive voltage source P+. The collector of transistor T6 is connected through a collector resistor 62 to the negative voltage source P—. The base electrode of the transistor T7 is connected to the cathode of a diode 64. The anode of diode 64 is connected to the emitter of transistor T5. The base of the transistor T6 is connected to a diode 66 at its anode electrode with the cathode of diode 66 being connected to the collector of the transistor T5. A capacitor 72 is connected between the collector and base of the transistor T6 and a capacitor 74 is connected between the collector and base of transistor T7. The purpose of the capacitors 72 and 74 is to attenuate the gain of the limiter circuit with frequency so as to avoid stability problems that might be introduced into the operational amplifier from using an active feedback element, the transistor T6 or T7, which causes high loop gains.

The output limits of the voltage $E_0$ of the operational amplifier A are maximum when the control voltage $E_c$ is at a zero value. By increasing the control voltage $E_c$ in the positive direction, the transistor T1 is rendered conductive which makes the collector thereof less positive. The current through T1 increases while the current through T2 decreases to maintain a constant net current through T3. Since, as previously described, the transistor T3 is always biased on and having an emitter voltage 0.6 less than its base, decreasing the resistance of this circuit with potentiometer P1 will thereby increase the current flow. As the current flow increases, the collector voltage of both transistors T1 and T2 becomes less positive.

By decreasing the control voltage $E_c$ in a negative direction, transistor T1 is driven to non-conduction and terminal G becomes positive with respect to the control voltage $E_c$. Potentiometer P1 may be adjusted in the same fashion as previously described for controlling the collector voltage of transistor T2 for a given value for the control signal $E_c$. The effect of the differential amplifier 12 in combination with the constant current generator 30 is to act as an absolute value detector to thereby provide an identical control signal to the base of transistor T4 regardless of the polarity of the input control signal $E_c$.

Transistor T4 is responsive to the output signal from the differential amplifier as applied to its base. Resistors 42 and 44 form a voltage divider which holds the emitter of transistor T4 at a predetermined voltage level. Inasmuch as T4 is a PNP type transistor, it will not conduct until its base is less positive than the predetermined emitter voltage. Thus, as the control voltage $E_c$ is applied to either transistor T1 or T2, the collector voltage of one is connected in common to the base of transistor T4. Transistor T4 begins to conduct and its collector voltage increases which upsets the previous bias on transistor T5 as determined by the voltage divider P3, resistors 46 and 48.

The collector of transistor T4 is connected in common with the base of transistor T5 and acts as a driver stage once transistor T4 begins to conduct. The gain or rate of change of the output signal per input control signal is thereby determined by the amplification or gain associated with this driver transistor T4. Regulation is achieved by adjusting the tap on potentiometer P2 to alter the current magnitude to the emitter of transisor T4.

The voltages at the emitter and collector of transistor T5 are nearly equal with respect to the ground terminal G but of opposite sign. Thus equal voltages are applied to the bases of T6 and T7 through diodes 66 and 64. During a period of non-limit operation or when transistor T4 is not conductive, the base voltage of transistor T5 is set by the voltage divider comprised of potentiometer P3, resistors 46 and 48. The excursion level limits of the operational amplifier A are then determined through adjustment of potentiometer P3.

The output of the operational amplifier A is connected to the emitter of transistors T6 and T7 as a feedback voltage. When the output $E_0$ of the operational amplifier A is of sufficient magnitude, transistor T6 or T7 will become conductive to current from the summing junction SJ of the operational amplifier A and the limiting operation will regulate to prevent further increases in output voltage. For example, if five volts were established at the base of transistor T6, any positive output of the operational amplifier A more positive than five volts plus about 0.6 volt across the base-emitter of transistor T6 will cause the emitter of transistor T6 to become more positive than the base and thus transistor T6 would become conductive as well as diode 66. Transistor T6 produces an output path of positive current through conductive diode 56 to the summing junction SJ of the operational amplifier A. Since the original positive output signal $E_0$ of operational amplifier A is a resultant of a negative input signal, the current output signal from transistor T6 is of opposite polarity and the net result at the summing junction SJ is a decrease in signal input.

Since the base and emitter voltages of transistor T5 are substantially equal but of opposite polarity a positive potential of five volts at the base of transistor T6 would necessarily mean a negative potential of −5 volts at the base of transistor T7. Thus any negative output signal $E_0$ from the operational amplifier A greater than −5.6 volts including the base emitter drop at transistor T7 would render it conductive and draw current away from the summing junction SJ of the operational amplifier A. Since a negative output signal is a result of a positive input signal, drawing away current from the input has the effect of making the input signal at SJ of the operational amplifier A less positive and thereby the output signal $E_0$ would be less negative.

During non-limit operation, transistors T6 and T7 are non-conductive so that diodes 56 and 58 are reverse biased effectively isolating the summing junction SJ of the operational amplifier A from the limiter circuitry. Diodes 66 and 64 are also reverse biased at this time to avoid excessive reverse voltages across the base-emitter junction of transistors T6 and T7.

A diode 65 is connected with its anode common to the emitter of transistor T5 and its cathode connected to one side of a resistor 53, the other side of which is connected to the negative voltage source P−. A forward biased diode 63 is provided between the ground terminal G and the first side of resistor 53. It is possible to overdrive transistor T5 at high values of control voltage, $E_c$, by forcing current through the base-emitter junction after transistor T5 has saturated. This excess current would flow through resistor 52 raising the emitter voltage of T5. However, the normally negative voltage at the emitter of T5, which becomes less negative as the control voltage $E_c$ increases, cannot exceed zero volts since it is clamped by diode 65. Any excess base driving current at transistor T5 now has a path to ground through diodes 65 and 63. Diode 63 is biased on by resistor 53 and pulls the cathode of diode 65 below ground such that the clamping at the emitter of T5 occurs at zero volts rather than +0.6 volt.

The output limits of the voltage $E_0$ are maximum when the control voltage $E_c$ is set at a zero value. By increasing the control voltage $E_c$ in the positive direction, the transistor T4 is rendered conductive which in turn alters the base voltage on transistor T5 to lower the absolute magnitudes of the base voltages of transistors T6 and T7 until they become conductive and begin the limiting operation. Thus the output limits of the operational amplifier A are reduced as the control voltage is increased in the positive direction as shown in quadrants I and IV of FIG. 3. The output limit, in other words, varies inversely with the positive magnitude of the control voltage. The gain of the limiter circuit is controlled by the potentiometer P2 connected in the emitter circuit of the transistor T4 and establishes the slope of the change of output voltage $E_0$ per control voltage $E_c$ as shown in FIG. 3. The bias control potentiometer P1, regulates the breakpoint in the output curve, i.e., the minimum control voltage required to begin the limiting action. The level or maximum output voltage is determined by the setting of the tap of potentiometer P3 in the voltage divider regulating the bias of transistor T5 when transistor T4 is not conducting. A negative control signal $E_c$, as previously discussed, applies the same energizing signal to the base of transistor T4 as a positive signal of the same magnitude due to the function of the absolute value detector 12. Thus, quadrants II and III of FIG. 3 for negative control signals would necessarily be symmetrical to quadrants I and IV.

The versatility of this invention is easily illustrated in FIGS. 4 and 5 where a typical range of operation is demonstrated. In particular, FIG. 4 shows a bias range of 0 to 7 volts with a level of 10 volts at 25° C. The extent of this range is realized by the extreme settings of the bias control P1 in FIG. 2. As ambient temperature increases, the output characteristics decrease in both level and bias as seen by the 60° C. curve in FIG. 4. Minimum bias is achieved by adjusting potentiometer P1 such that the emitter circuit of transistor T3 has a minimum resistance. Maximum bias, on the other hand, would suggest a setting for maximum resistance.

Referring to FIG. 5, the extreme ranges of gain adjustment are illustrated at a zero bias condition with a level of 10 volts. Maximum gain results in a minimum output signal at a control voltage one volt whereas minimum gain results in a minimum output signal at a control voltage of nine volts. The output voltage at minimum gain is 0.9 volt greater than that at maximum gain because of the voltage drop of diode 65 when transistor T5 is over-saturated.

Although the present invention has been described with a certain degree of particularity, it should be understood that the present disclosure has been made only by way of example and that numerous changes in the details of construction and the combination and arrangement of parts and elements may be resorted to without departing from the spirit and scope of the present invention.

We claim as our invention:

1. A limiting circuit for controlling the positive and negative output limits of an operational element in response to the absolute value of a control signal independent of the input to said operational element comprising:

feedback circuit means connected between the input and output of said operational element and including first and second feedback circuits including first and second active elements respectively having applied thereto first and second reference signals respectively for establishing thereby the positive and negative output limits for said operational element, the operative condition of each of said active elements being responsive respectively to the positive and negative limits of said operational element to prohibit thereby the output limits from being exceeded and means to isolate said first and second feedback circuits respectively from said operational element when operating within said output limits;

a differential amplifier responsive to said control signal to provide an absolute signal independent of the polarity of said control signal; and driver means including a phase splitter responsive to said absolute signal for developing said first and second reference signals of opposite polarity for application to said first and second active elements respectively.

2. The circuit of claim 1 includes:

constant current means operatively connected to said differential amplifier to control the magnitude of said absolute signal.

3. The circuit of claim 1 includes:

means for adjusting the absolute magnitude of said output limits.

4. The circuit of claim 1 wherein:

said driver means includes means for adjusting the rate of change of the output of said operational element in response to said control signal when said operational element is within its output limits.

5. The circuit of claim 1 wherein:

said first and second active elements respectively comprise transistor devices of the opposite conductivity types.

References Cited

UNITED STATES PATENTS

| | | | |
|---|---|---|---|
| 2,883,480 | 4/1959 | Grenier | 330—86 |
| 2,903,522 | 9/1959 | Flower | 330—28 |
| 3,046,487 | 7/1962 | Matzen et al. | 330—28 |
| 3,076,901 | 2/1963 | Rubin et al. | 307—229 |
| 3,255,419 | 6/1966 | Knapton et al. | 330—28 |
| 3,162,818 | 12/1964 | Murphy | 330—86 |
| 3,248,569 | 4/1966 | Weekes | 307—237 |
| 3,292,098 | 12/1966 | Bensing | 330—30 |
| 3,299,287 | 1/1967 | Staeudle | 307—229 |
| 3,331,030 | 7/1967 | Jordan et al. | 330—145 |

DONALD D. FORRER, Primary Examiner

H. A. DIXON, Assistant Examiner

U.S. Cl. X.R.

307—229; 330—69